United States Patent
Kim et al.

(10) Patent No.: US 8,999,085 B2
(45) Date of Patent: Apr. 7, 2015

(54) HIGH MANGANESE STEEL STRIPS WITH EXCELLENT COATABILITY AND SUPERIOR SURFACE PROPERTY, COATED STEEL STRIPS USING STEEL STRIPS AND METHOD FOR MANUFACTURING THE STEEL STRIPS

(75) Inventors: Seong-Ju Kim, Kyungsangbook-do (KR); Kwang-Geun Chin, Kyungsangbook-do (KR); Hyun-Gyu Hwang, Kyungsangbook-do (KR); Sung-Kyu Kim, Kyungsangbook-do (KR); Il-Ryoung Sohn, Kyungsangbook-do (KR); Young-Kook Lee, Seoul (KR); Oh-Yeon Lee, Cheonlabook-do (KR)

(73) Assignee: Posco, Pohang-si (KR)

( * ) Notice: Subject to any disclaimer, the term of this patent is extended or adjusted under 35 U.S.C. 154(b) by 356 days.

(21) Appl. No.: 12/158,731

(22) PCT Filed: Dec. 22, 2006

(86) PCT No.: PCT/KR2006/005653
§ 371 (c)(1),
(2), (4) Date: Sep. 2, 2008

(87) PCT Pub. No.: WO2007/075006
PCT Pub. Date: Jul. 5, 2007

(65) Prior Publication Data
US 2009/0202382 A1    Aug. 13, 2009

(30) Foreign Application Priority Data
Dec. 26, 2005    (KR) .................. 10-2005-0129513

(51) Int. Cl.
*C23C 14/34* (2006.01)
*C25D 7/00* (2006.01)
(Continued)

(52) U.S. Cl.
CPC .............. *C22C 38/02* (2013.01); *C21D 6/004* (2013.01); *C21D 8/04* (2013.01); *C21D 8/0405* (2013.01); *C21D 9/48* (2013.01); *C22C 38/002* (2013.01);
(Continued)

(58) Field of Classification Search
None
See application file for complete search history.

(56) References Cited

U.S. PATENT DOCUMENTS 4,240,827 A   12/1980   Aihara et al.
4,373,951 A   2/1983    Ouchi et al.
(Continued)

FOREIGN PATENT DOCUMENTS

DE   WO 2006/048034   *   5/2006   .............. C21D 8/02
EP        0502390 A1       9/1992
(Continued)

OTHER PUBLICATIONS
Translation of Guelton, FR2829775 (2003).*

*Primary Examiner* — Yoshitoshi Takeuchi
(74) *Attorney, Agent, or Firm* — The Webb Law Firm

(57) ABSTRACT

A high-ductility, high-strength and high Mn steel strip used for steel strips of automobiles requiring superior formability and high strength, a plated steel strip produced by using the same, and a manufacturing method thereof are disclosed. The high Mn steel strip comprises, by weight %, 0.2~1.5% of C, 10~25% of Mn, 0.01~3.0% of Al, 0.005~2.0% of Si, 0.03% or less of P, 0.03% or less of S, 0.040% or less of N, and the balance of Fe and other unavoidable impurities. The high-ductility, high-strength and high Mn steel strip, and the plated steel strip produced by using the same have superior surface properties and plating characteristics.

5 Claims, 1 Drawing Sheet

(51) Int. Cl.
*C25D 9/00* (2006.01)
*C25D 11/00* (2006.01)
*B22D 17/00* (2006.01)
*C21D 1/84* (2006.01)
*C21D 5/00* (2006.01)
*C21D 8/04* (2006.01)
*C21D 9/00* (2006.01)
*C21D 8/02* (2006.01)
*C21D 6/00* (2006.01)
*C21D 8/00* (2006.01)
*C21D 6/02* (2006.01)
*C22C 38/02* (2006.01)
*C21D 9/48* (2006.01)
*C22C 38/00* (2006.01)
*C22C 38/04* (2006.01)
*C22C 38/06* (2006.01)
*C22C 38/28* (2006.01)
*C22C 38/32* (2006.01)

(52) U.S. Cl.
CPC ............... *C22C 38/04* (2013.01); *C22C 38/06* (2013.01); *C22C 38/28* (2013.01); *C22C 38/32* (2013.01)

(56) References Cited

U.S. PATENT DOCUMENTS

| | | | |
|---|---|---|---|
| 5,296,677 A | | 3/1994 | Takahashi et al. |
| 5,431,753 A | | 7/1995 | Kim et al. |
| 5,647,922 A | * | 7/1997 | Kim et al. ............... 148/620 |
| 5,810,950 A | | 9/1998 | Kim et al. |
| 6,358,338 B1 | * | 3/2002 | Guelton et al. ............ 148/547 |
| 6,797,411 B2 | * | 9/2004 | Sodani et al. ............. 428/659 |
| 2003/0145911 A1 | * | 8/2003 | Hoffmann et al. .......... 148/329 |
| 2008/0035248 A1 | | 2/2008 | Cugy et al. |
| 2009/0010793 A1 | * | 1/2009 | Becker et al. ............... 420/38 |

FOREIGN PATENT DOCUMENTS

| | | | | |
|---|---|---|---|---|
| FR | 2829775 | * | 3/2002 | ............ C22C 38/04 |
| FR | WO 03025240 | * | 3/2002 | ............ B21C 37/08 |
| FR | 2857980 A1 | | 1/2005 | |
| GB | 2010906 | | 7/1979 | |
| JP | 54116322 A | | 9/1979 | |
| JP | 55089454 A | | 7/1980 | |
| JP | 56059597 A | | 5/1981 | |
| JP | 56090923 A | | 7/1981 | |
| JP | 60036647 A | | 2/1985 | |
| JP | 4259325 A | | 9/1992 | |
| JP | 05263194 A | | 10/1993 | |
| JP | 7109546 A | | 4/1995 | |
| JP | 19503243 A | | 3/1998 | |
| JP | 2001049348 A | | 2/2001 | |
| KR | 19950026569 A | | 10/1995 | |
| WO | 9313233 A1 | | 7/1993 | |
| WO | 9526423 A1 | | 10/1995 | |
| WO | 02101109 A1 | | 12/2002 | |
| WO | 2006056670 A2 | | 6/2006 | |

* cited by examiner

[Fig. 3]

HIGH MANGANESE STEEL STRIPS WITH EXCELLENT COATABILITY AND SUPERIOR SURFACE PROPERTY, COATED STEEL STRIPS USING STEEL STRIPS AND METHOD FOR MANUFACTURING THE STEEL STRIPS

TECHNICAL FIELD

The present invention generally relates to high-ductility, high-strength and high Mn steel strips used for automobiles and the like requiring superior formability and high strength, plated steel strips using the same, and a manufacturing method thereof. More particularly, the present invention relates to high-ductility, high-strength and high Mn steel strips with excellent plating characteristics and superior surface properties, plated steel strips using the same, and a manufacturing method thereof.

BACKGROUND ART

Due to low formability of conventional high strength steel strips developed for application to structural members and interior sheets of automobiles, it is difficult to apply such high strength steel strips to components of complicated shapes.

Conventionally, automobile manufacturers have focused on simplification of the complicated shapes or separate machining of several discrete pieces constituting a single complicated component.

However, formation of the complicated components with separate machining of the several discrete pieces requires a secondary welding process and provides significant limits in design of an automobile vehicle body due to differences in strength between a welded part and a matrix.

Thus, the automobile manufacturers have continuously demanded high strength and high formability materials that can be applied to such complicated components and increase a freedom of design with respect to the automobile body.

In particular, it has been increasingly demanded with the aim of enhancing fuel efficiency and reducing air pollution to provide high strength steel strips that have superior formability and can reduce the weight of automobiles.

As to conventional steel strips for automobiles, high strength low carbon steels with ferritic matrix structure have been used in consideration of the formability.

However, in the case where the high strength low carbon steels are applied to automobile steel sheets, steel having tensile strength of 800 MPa or more fails to ensure elongation up to 30% or more in commercial applications.

As such, since it is difficult to apply the high strength steel at the level of 800 MPa or more to the automobile components of the complicated shapes, such high strength steel also requires simplification of the shapes and fails to ensure the freedom of design for the components. To solve such problems, novel steels have been studied, and some examples thereof can include high-ductility, high-strength and high Mn austenitic steels as disclosed in JP1992-259325 and WO 02/101109.

For the high Mn steel of JP1992-259325, although ductility can be secured by addition of Mn in a large amount, a deformed part of the high Mn steel experiences severe work hardening. As a result, it has a shortcoming in that steel strips thereof are likely to experience fracture after machining.

For the high Mn steel of WO 02/101109, although the ductility can also be secured, it has shortcomings in terms of electroplating and galvanizing properties due to addition of silicon in a large amount.

Moreover, since other types of steel contain large amounts of Mn, they have a shortcoming in that annealed products thereof have significantly low corrosion resistance.

Therefore, it is an object of the present invention to provide a steel strip that has superior formability, high strength, superior surface properties and plating characteristics, and a plated steel strip using the same.

It is another object of the present invention to provide a steel strip that not only has superior formability, high strength, superior surface properties and plating characteristics, but also is relieved in sensitivity to generation of cracks, and a plated steel strip using the same.

SUMMARY OF THE INVENTION

In accordance with one aspect of the present invention, a high Mn steel strip having superior surface properties and plating characteristics is provided, comprising, by weight %: 0.2~1.5% of C; 10~25% of Mn; 0.01~3.0% of Al; 0.005~2.0% of Si; 0.03% or less of P; 0.03% or less of S; 0.040% or less of N; and the balance of Fe and other unavoidable impurities.

Preferably, the steel strip further comprises: at least one component selected from the group consisting of 0.1~2.0% of Cr, 0.0005~0.010% of Ca, 0.01~0.10% of Ti, and 0.001~0.020% of B.

The steel strip may comprise a cold-rolled steel strip and a hot-rolled steel strip.

In accordance with another aspect of the present invention, a high Mn plated steel strip having superior plating characteristics is provided, comprising, by weight %: 0.2~1.5% of C; 10~25% of Mn; 0.01~3.0% of Al; 0.005~2.0% of Si; 0.03% or less of P; 0.03% or less of S; 0.040% or less of N; and the balance of Fe and other unavoidable impurities, wherein the steel strip has a plated layer on a surface thereof.

Preferably, the plated steel strip further comprises: at least one component selected from the group consisting of 0.1~2.0% of Cr, 0.0005~0.010% of Ca, 0.01~0.10% of Ti, and 0.001~0.020% of B.

The plated steel strip may comprise an electroplated steel strip, of which the plated layer is an electroplated layer, a hot-dip galvanized steel strip, of which the plated layer is a hot-dip galvanized layer, or a galvannealed steel strip, of which the plated layer is a galvannealed layer.

In accordance with yet another aspect of the invention, a method for manufacturing a high Mn hot-rolled steel strip having superior surface properties and plating characteristics is provided, comprising: homogenizing either a steel ingot or a continuous cast steel slab at 1,050~1,300° C., the steel ingot or the steel slab comprising, by weight %: 0.2~1.5% of C, 10~25% of Mn, 0.01~3.0% of Al, 0.005~2.0% of Si, 0.03% or less of P, 0.03% or less of S, 0.040% or less of N, and the balance of Fe and other unavoidable impurities; and hot rolling the homogenized steel ingot or steel slab with finish rolling at a finish rolling temperature of 850~950° C. to form a hot-rolled steel strip, followed by coiling the hot-rolled steel strip at a temperature of 700° C. or less.

In accordance with yet another aspect of the invention, a method for manufacturing a high Mn cold-rolled steel strip having superior surface properties and plating characteristics is provided, comprising: homogenizing either a steel ingot or a continuous cast steel slab at 1,050~1,300° C., the steel ingot or the steel slab comprising, by weight %: 0.2~1.5% of C, 10~25% of Mn, 0.01~3.0% of Al, 0.005~2.0% of Si, 0.03% or less of P, 0.03% or less of S, 0.040% or less of N, and the balance of Fe and other unavoidable impurities; hot rolling the homogenized steel ingot or steel slab with finish rolling at a finish rolling temperature of 850~950° C. to form a hot-rolled steel strip, followed by coiling the hot-rolled steel strip at a temperature of 700° C. or less; cold rolling the hot-rolled steel strip at a cold rolling reduction ratio of 30~80% to form a cold-rolled steel strip; and continuously annealing the cold-rolled steel strip at a temperature of 600° C. or more.

In accordance with yet another aspect of the invention, a method for manufacturing a high Mn plated steel strip is provided, comprising: homogenizing either a steel ingot or a continuous cast steel slab at 1,050~1,300° C., the steel ingot or the steel slab comprising, by weight %: 0.2~1.5% of C, 10~25% of Mn, 0.01~3.0% of Al, 0.005~2.0% of Si, 0.03% or less of P, 0.03% or less of S, 0.040% or less of N, and the balance of Fe and other unavoidable impurities; hot rolling the homogenized steel ingot or steel slab with finish rolling at a finish rolling temperature of 850~950° C. to form a hot-rolled steel strip, followed by coiling the hot-rolled steel strip at a temperature of 700° C. or less; cold rolling the hot-rolled steel strip at a cold rolling reduction ratio of 30~80% to form a cold-rolled steel strip; and continuously annealing the cold-rolled steel strip at a temperature of 600° C. or more, followed by performing one of electroplating, hot-dip galvanizing and galvannealing.

The present invention provides a steel strip that has superior formability, high strength, superior surface properties and plating characteristics, and a plated steel strip using the same.

Moreover, the present invention provides a steel strip that not only has superior formability, high strength, superior surface properties and plating characteristics, but is also relieved in sensitivity to generation of cracks, and a plated steel strip using the same.

BRIEF DESCRIPTION OF THE DRAWINGS

FIG. 3 comprises photographs showing results of observing galvanizing properties depending on added amounts of silicon.

BEST MODE FOR CARRYING OUT THE INVENTION

Figure 1:
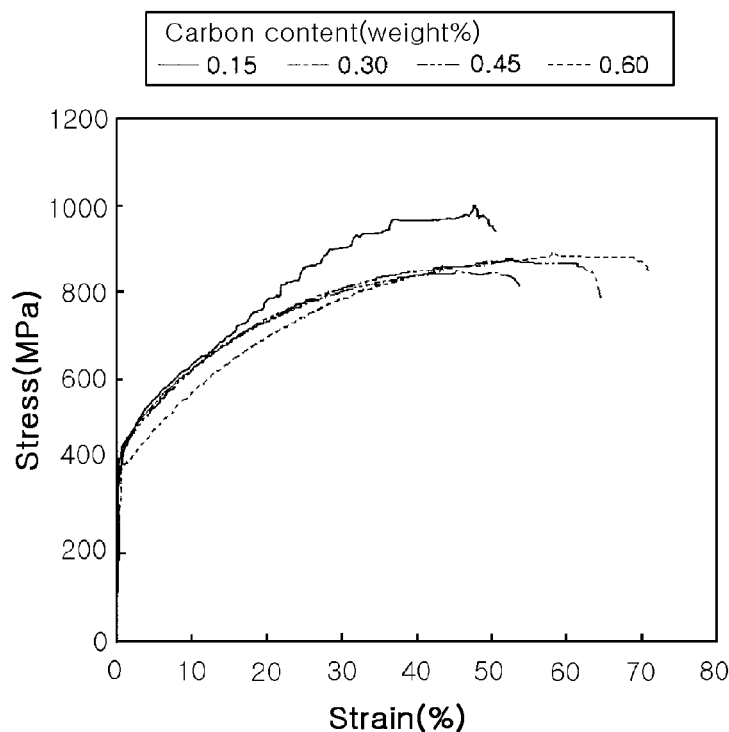
FIG. 1 shows stress-strain curves as a function of added amounts of carbon.

The present invention will be described in detail hereinafter.

According to the invention, steel has improved strength and ductility by minimizing an added amount of Mn which is generally added to obtain a complete austenitic structure at room temperature and by suitably controlling added amounts of carbon and aluminum which are added to promote deformation twinning when machining the steel. As a result, problems related to addition of Mn in a large amount in steel manufacturing, continuous casting and rolling can be solved. Furthermore, according to the invention, the steel is prevented from surface property degradation resulting from rapid corrosion on the surface of high Mn steel through suitable addition of silicon, thereby improving the surface properties of steel strips.

Moreover, according to the invention, problems related to surface cracks easily occurring in manufacture of the high Mn steel and to crack sensitivity of products are solved by suitably controlling added amounts of titanium, boron and chromium, so that productivity can be improved.

The composition of the steel and reasons of limiting the composition will be described hereinafter.

Since carbon (C) contributes stabilization of austenite, it is more and more advantageous as carbon content increases.

If carbon content is less than 0.2 wt % (hereinafter, "%"), $\alpha'$-martensite is created upon deformation, and causes generation of cracks during work and decrease in ductility. Thus, preferably, the carbon content has a lower limit of 0.2%.

If the carbon content exceeds 1.5%, the stabilizing degree of austenite is remarkably increased, so that formability is lowered due to transition of deformation behavior by slip deformation. Thus, preferably, the carbon content has an upper limit of 1.5%.

Manganese (Mn) is also an essential element for stabilization of austenite. However, if Mn content is less than 10%, $\alpha'$-martensite causing deterioration of the formability is formed so that the strength of the steel increases, whereas the ductility of the steel decreases remarkably. Thus, preferably, the Mn content has a lower limit of 10%.

If the Mn content exceeds 30%, twinning is suppressed, causing an increase of the strength while decreasing the ductility.

Additionally, as the Mn content increases, the cracks can be easily created during hot rolling and manufacturing costs are increased due to addition of expensive Mn in large amounts. Thus, preferably, the Mn content has an upper limit of 25%.

Generally, aluminum (Al) is added for deoxidation of steel. In this invention, however, Al is added to improve the ductility of the steel.

In other words, although Al is a ferrite stabilizing element, Al increases stacking fault energy in slip planes of the steel and suppresses generation of $\epsilon$-martensite, improving the ductility of the steel.

Furthermore, since Al suppresses generation of $\epsilon$-martensite in the case of a low content of Mn, Al provides great contribution to minimization in content of Mn and improvement in formability.

Accordingly, if the content of Al is less than 0.01%, $\epsilon$-martensite is formed, increasing the strength of the steel while rapidly deteriorating the ductility. Thus, preferably, the Al content has a lower limit of 0.01%.

However, if the Al content exceeds 3.0%, twinning is suppressed, thereby causing a decrease of the ductility, deterioration of casting properties during continuous casting, and severe surface corrosion during hot rolling which leads to deterioration of the surface properties of the products. Thus, preferably, the Al content has an upper limit of 3.0%.

It is known that, if silicon (Si) is excessively added, it generally forms a silicon oxide layer on the surface of the steel, deteriorating galvanizing properties.

However, in steel with Mn added in a large amount, a suitably added amount of Si forms a thin silicon oxide layer on the surface of the steel, thereby suppressing oxidation of iron and manganese. Thus, such a suitable content of Si can prevent a thick ferrous oxide layer or a thick manganese oxide layer from being formed on a cold-rolled steel strip after cold rolling, and corrosion from progressing on the cold-rolled steel sheet after annealing to improve the surface properties, so that the steel strip can maintain superior surface properties which are required for a matrix steel strip used for electroplating.

In addition, since formation of the thick ferrous oxide layer or the thick manganese oxide layer is suppressed by Si during hot-dip galvanizing, the galvanizing properties are significantly improved.

Moreover, in terms of material properties, the suitable content of Si serves to increase the strength and ductility.

That is, if silicon is not added to the steel, the thick ferrous oxide layer or the thick manganese oxide layer is formed on the surface of the steel and causes an extension of a pickling period of time in electroplating along with easy corrosion of annealed steel, thereby failing to keep favorable surface properties of the cold-rolled steel strip.

Thus, preferably, the Si content has a lower limit of 0.005%.

In particular, in the case where the content of Si exceeds 0.6%, it is possible to attain further excellent corrosion resistance.

However, an excessive amount of Si causes formation of silicon oxide on the surface of the steel during hot rolling, which degrades the pickling properties and surface properties of a hot-rolled steel strip.

In addition, Si is enriched on the steel surface in hot annealing during continuous annealing and continuous hot-dip galvanizing processes, and decreases wettability of molten zinc on the steel surface during the hot-dip galvanizing, thereby deteriorating plating properties.

Moreover, the excessive amount of Si significantly deteriorates welding properties of the steel.

Thus, preferably, the Si content has an upper limit of 2.0%.

Since phosphorous (P) and sulfur (S) are unavoidable elements in manufacturing of steel, it is preferable that added amounts thereof be 0.03% or less.

In particular, since P causes segregation to deteriorate the formability and sulfur causes formation of coarse manganese sulfide (MnS) to generate defects such as flange cracks and degrade hole-expansion properties of a steel strip, it is preferable to suppress the contents of P and S as much as possible.

Nitrogen (N) promotes generation of twins through reaction with aluminum and precipitation of fine nitrides during solidification within austenite grains, thereby improving the strength and ductility during formation of the steel. However, if nitrogen content exceeds 0.04%, excessive precipitation of nitride occurs, deteriorating hot workability and elongation. Thus, preferably, the nitrogen content has a lower limit of 0.040%.

Chromium (Cr) prevents decarburization of the steel and generation of α'-martensite on the steel surface during hot rolling, improving the formability of the steel. Thus, an added amount of Cr has a lower limit of 0.1%. An increase in content of Cr acting as a ferrite stabilizing element promotes generation of α'-martensite and decreases the ductility of the steel. Thus, preferably, the Cr content has an upper limit of 2.0%.

Calcium (Ca) reacts with non-metallic inclusions such as $Al_2O_3$, MnO, MnS, etc. in molten steel to form compounds and spheroidized non-metallic inclusions, thereby increasing fracture strength of columnar grain boundaries, relieving sensitivity with respect to generation of flange cracks in the steel strip, and improving the hole-expansion properties of the steel strip.

However, the content of Ca less than 0.0005% does not provide any effect of addition, whereas the content of Ca more than 0.010% causes saturation of effect of addition. Therefore, the Ca content is preferably in the range of 0.0005~0.010%.

Titanium (Ti) is dissolved in the columnar grain boundaries and prevents formation of liquid phase films at 1,300° C. or less by increasing the melting temperatures of aluminum enriched compounds having low melting points. In addition, Ti has a high affinity to nitrogen and acts as precipitation nuclei of coarse aluminum nitride which causes embrittlement of the columnar grain boundaries, thereby strengthening the columnar grain boundaries.

However, the content of Ti less than 0.005% does not provide any effect of addition, whereas the content of Ti more than 0.10% causes grain boundary embrittlement through segregation of an excessive amount of Ti in the grain boundaries. Therefore, the Ti content is preferably in the range of 0.005~0.10%.

Boron (B) is dissolved in the columnar grain boundaries at 1,000° C. or more and strengthens the columnar grain boundaries by suppressing generation and movement of vacancies.

However, an added amount of B less than 0.0005% does not provide any effect of addition, whereas an added amount of B more than 0.040% promotes precipitation of the coarse aluminum nitride by generating great amounts of carbide and nitride which act as the precipitation nuclei of the coarse aluminum nitride, causing embrittlement of the grain boundaries.

Thus, B is preferably added in the range of 0.0005~0.020%.

The manufacturing conditions of the present invention will be described hereinafter.

Generally, hot-rolled steel strips of high Mn steel are produced by continuous casting as in a process of manufacturing a general steel strip.

Of course, it should be noted that the present invention is not limited to continuous casting.

According to the invention, in typical conditions, a steel slab having the composition as described above is homogenized at about 1,050~1,300° C., followed by hot rolling with finish rolling at a finish rolling temperature of 850~950° C. and coiling at 650° C. or less, producing a hot-rolled steel strip.

According to the invention, for hot rolling, the continuous cast slab of high Mn steel is preferably reheated to 1,050~1,300° C. The reason of setting the upper limit of the reheating temperature to be 1,300° C. is as follows. That is, since the melting points of compounds having low melting points in columnar grain boundaries are elevated near to 1,300° C. by minute addition of alloying elements serving to strengthen the columnar grain boundaries, heating the slab above 1,300° C. causes generation of a liquid phase film in the columnar grain boundaries of the continuous cast slab so that cracks occur therefrom during hot rolling.

The reason of setting the lower limit of the reheating temperature to be 1,050° C. is that a lower reheating temperature results in a narrow temperature region for the finish rolling temperature, thereby failing to allow sufficient rolling of the slab to a desired thickness.

If finish rolling is performed at too low temperatures, there is an increase of rolling load, which causes not only overwork of rollers, but also negative influence on the interior quality of the steel strip.

Therefore, according to the invention, it is preferable that the finish rolling temperature be in the range of 850~950° C.

Since an excessively high hot coiling temperature causes a thick oxide layer on the surface of the hot-rolled steel strip and interior corrosion of the hot-rolled steel strip, the oxide layer is not easily removed by pickling.

Thus, it is desirable that coiling of the hot-rolled steel strip be performed at a low temperature.

According to the invention, the hot-rolled steel strip is coiled at 700° C. or less.

After finishing the hot rolling, cold rolling is performed to match the shape and thickness of the steel strip to those of a custom steel strip. At this time, a cold-rolling reduction ratio is preferably in the range of 30~80%.

Then, the cold-rolled steel strip is subjected to continuous annealing at 600° C. or more.

Here, if the annealing temperature is too low, it is difficult to ensure sufficient formability, and sufficient austenitic deformation does not occur to such an extent of allowing austenite to be maintained at low temperatures. Thus, the annealing is preferably performed at 600° C. or more.

Since the steel of the invention is an austenitic steel that does not allow phase transformation and it is possible to ensure the sufficient formability by heating the steel to a recrystallization temperature or more, the steel strip is produced by annealing in a typical annealing condition.

It is possible to produce an electroplated steel strip by electroplating the steel strip produced as described above.

Electroplating is performed in a typical electroplating condition.

Furthermore, it is possible to produce a hot-dip galvanized steel strip by hot-dip galvanizing the steel strip produced as described above. Otherwise, it is possible to produce a galvannealed steel strip by galvannealing the steel strip, if necessary.

Hot-dip galvanizing is performed by a typical method. Preferably, the hot-dip galvanizing is performed at about 460° C. after recrystallization annealing the steel strip produced as above at 600° C. or more.

The present invention will be described in more detail with reference to examples hereinafter.

EXAMPLES

Experiment 1

Steel ingots having compositions as shown in Table 1 were heated at 1,200° C. for 1 hour in a heating furnace, followed by hot rolling.

Here, the steel ingots were hot-rolled at a finish rolling delivery temperature of 900° C. and coiled at a temperature of 650° C. to produce hot-rolled steel strips.

Each hot-rolled steel strip was cut to form a JIS No. 5 tensile-test sample and subjected to a tensile test. Results of the tensile test are shown in Table 2 below.

Then, the hot-rolled steel strips were subjected to pickling and cold-rolling at a cold-rolling reduction ratio of 50% to produce cold-rolled steel strip.

Subsequently, the cold-rolled steel strips were subjected to simulation heat treatment of continuous annealing in which annealing was performed at 800° C. and over-ageing was performed at 400° C. for 400 seconds.

After the simulation heat treatment of continuous annealing, the steel strips were subjected to the tensile test by using a universal testing machine, of which results are shown in Table 2.

Meanwhile, to investigate availability of the steel strips to hot-dip galvanizing, the cold-rolled steel strips were subjected to a simulation test for hot-dip galvanizing in which annealing was performed at a temperature of 800° C. and the temperature of a hot-dip galvanizing bath was 460° C. Results of the test are shown in Table 2.

TABLE 1

| Steels | Compositions (wt %) | | | | | | | | | | | Remark |
| --- | --- | --- | --- | --- | --- | --- | --- | --- | --- | --- | --- | --- |
| | C | Mn | Al | Si | P | S | Cr | Ti | Nb | B | Ca | |
| 1 | 0.45 | 12.0 | 1.48 | 0.01 | 0.01 | 0.011 | — | — | — | — | — | IS |
| 2 | 0.44 | 14.8 | 1.40 | 0.01 | 0.012 | 0.009 | — | — | — | — | — | IS |
| 3 | 0.45 | 18.0 | 1.30 | 0.02 | 0.01 | 0.008 | — | — | — | — | — | IS |
| 4 | 0.43 | 15.0 | 0.0045 | 0.01 | 0.009 | 0.005 | — | — | — | — | — | CS |
| 5 | 0.15 | 15.0 | 1.50 | 0.02 | 0.010 | 0.005 | — | — | — | — | — | CS |
| 6 | 0.60 | 15.2 | 1.5 | 0.01 | 0.008 | 0.005 | — | — | — | — | — | IS |
| 7 | 0.72 | 18.6 | 1.40 | 0.02 | 0.011 | 0.005 | — | — | — | — | — | IS |
| 8 | 0.60 | 15.1 | 1.36 | 0.45 | 0.010 | 0.008 | — | — | — | — | — | IS |
| 9 | 0.60 | 15.1 | 1.36 | 2.5 | 0.009 | 0.008 | — | — | — | — | — | CS |
| 10 | 0.60 | 24 | 0.005 | — | 0.005 | 0.006 | — | — | — | — | — | CS |
| 11 | 0.10 | 6 | 0.04 | 0.5 | 0.010 | 0.010 | — | — | — | — | — | CS |
| 12 | 0.63 | 18.3 | 1.58 | 0.02 | 0.010 | 0.003 | 0.33 | — | — | — | 0.002 | IS |
| 13 | 0.62 | 18.1 | 1.50 | 0.02 | 0.009 | 0.004 | — | — | — | 0.001 | 0.004 | IS |
| 14 | 0.64 | 18.1 | 1.44 | 0.01 | 0.008 | 0.003 | 0.59 | — | — | 0.002 | 0.003 | IS |
| 15 | 0.61 | 18.3 | 1.50 | 0.55 | 0.010 | 0.003 | — | 0.019 | — | 0.001 | 0.003 | IS |
| 16 | 0.15 | 2.5 | 0.05 | 0.5 | 0.010 | 0.006 | — | — | 0.026 | — | — | CS |
| 17 | 0.61 | 18.0 | 1.51 | 1.52 | 0.008 | 0.003 | — | — | — | — | — | IS |

IS: Inventive Steel,
CS: Comparative Steel

TABLE 2

| Sample No. | Mechanical Properties | | | | Applicability of Hot-dip Galvanizing |
| --- | --- | --- | --- | --- | --- |
| | YS(Mpa) | TS(Mpa) | Elongation (%) | WH-index(n) | |
| 1 HS | 403 | 837 | 40.5 | 0.46 | Applicable |
| AS | 339 | 678 | 40.3 | 0.51 | |
| 2 HS | 435 | 875 | 66.7 | 0.45 | Applicable |
| AS | 341 | 862 | 63.2 | 0.53 | |
| 3 HS | 449 | 855 | 65.3 | 0.43 | Applicable |
| AS | 337 | 829 | 64.3 | 0.51 | |
| 4 HS | 374 | 922 | 32.8 | 0.47 | Applicable |
| AS | 373 | 978 | 37.0 | — | |
| 5 HS | 374 | 991 | 49.0 | — | Applicable |
| AS | 377 | 1019 | 52.5 | 0.25 | |
| 6 HS | 391 | 893 | 68.7 | — | Applicable |
| AS | 399 | 894 | 62.9 | 0.32 | |
| 7 HS | 500 | 919 | 56.1 | 0.25 | Applicable |
| AS | 403 | 902 | 80.9 | 0.33 | |
| 8 HS | 433 | 937 | 64.8 | 0.28 | Applicable |
| AS | 415 | 938 | 75.5 | 0.31 | |
| 9 HS | 567 | 979 | 54.0 | 0.24 | Non-applicable |
| AS | 514 | 994 | 66.9 | 0.26 | |
| 10 HS | 353 | 772 | 25.8 | 0.34 | Applicable |
| 11 HS | 818 | 1248 | 8.0 | — | Applicable |
| 12 HS | 564 | 936 | 56.4 | 0.21 | Applicable |
| AS | 441 | 910 | 70.0 | 0.30 | |
| 13 HS | 504 | 887 | 54.5 | 0.23 | Applicable |
| AS | 395 | 904 | 68.5 | 0.31 | |
| 14 HS | 531 | 896 | 51.6 | 0.22 | Applicable |
| AS | 433 | 922 | 68.4 | 0.31 | |
| 15 HS | 574 | 914 | 50.1 | 0.21 | Applicable |
| AS | 451 | 934 | 66.8 | 0.29 | |
| 16 HS | 545 | 646 | 23.7 | 0.17 | Applicable |

TABLE 2-continued

| Sample No. | | Mechanical Properties | | | Applicability of Hot-dip Galvanizing |
|---|---|---|---|---|---|
| | YS(Mpa) | TS(Mpa) | Elongation (%) | WH-index(n) | |
| 17 | AS 520 | 800 | 23.0 | 0.20 | |
| | HS 510 | 925 | 53.5 | 0.24 | Applicable |
| | AS 412 | 915 | 77.0 | 0.33 | |

HS: Hot-rolled Strip,
AS: Annealed Strip,
YS: Yield Strength,
TS: Tensile Strength,
WH-index: Work hardening index As is clear from Table 2, Sample Nos. 1~3 and Sample Nos. 6~7 containing carbon, manganese and aluminum in amounts under the ranges of the present invention ensure both high strength and high ductility at the same time.

Therefore, according to the invention, it is possible to ensure suitable properties for structural members of automobiles.

Sample Nos. 4 and 10 contain a high amount of Mn without containing Al. As is clear from Table 2, hot-rolled steel strips and cold-rolled steel strips (annealed strips) thereof have low tensile strength and ductility. Thus, Sample Nos. 3 and 10 are not suitable for high strength structural members.

Sample No. 5 contains a high amount of Mn and an insufficient amount of C. As a result, although Sample No. 5 has excellent strength and ductility, it has a rapid increasing zone of tensile strength by martensitic transformation, which causes work hardening of the structure and generation of cracks even with weak external impact after machining.

Thus, Sample No. 5 is not suitable for the structural members of the automobiles which require high endurance.

Sample Nos. 8 and 17 contain a suitable content of silicon and have high strength and ductility, thereby ensuring suitable material properties for the automobiles.

When a minute amount of Si is added to the steel, it serves to improve the surface properties of hot-rolled and cold-rolled steel strips by reducing a corrosion rate of the steel strips in air.

Sample No. 9 contains a large amount of silicon, which provides negative influence on hot-dip galvanizing properties. Therefore, although it has high tensile strength and superior ductility, Sample No. 9 is not suitable for the structural members of the automobiles which require high corrosion resistance.

Since Sample No. 11 contains a small amount of Mn, it suffers from a rapid increase in tensile strength resulting from martensitic transformation so that the ductility is significantly reduced. As such, Sample No. 11 fails to ensure sufficient ductility for automobile components.

Sample Nos. 12~15 contain small amounts of Cr, B, and Ca. As a result, Sample Nos. 12~15 have sufficient tensile strength and ductility as material for the automobile components. In addition, with such small amounts of the alloying elements, it is possible to prevent generation of cracks during hot rolling and hardening of the surface structure caused by decarburization. Furthermore, these alloying elements enable refinement of inclusions in the steel, thereby preventing cracks from being generated during working.

Sample No. 16 contains an insufficient amount of Mn and fails to ensure sufficient strength and ductility.

Experiment 2

For the steel having the composition of 0.43C-15Mn-1.5Al-0.01P-0.01S, the carbon content was changed and stress-strain curves were obtained depending on variation in carbon content, of which results are shown in FIG. 1.

The steel strips having the compositions of 0.6C-15Mn-1.5Al-0.5Si, 0.6C-15Mn-1.5Al-1.5Si and 0.6C-18Mn-1.5Al were left in air for 3 days and a degree of corrosion on each surface was measured. Results of measurement are shown in FIG. 2.

The steel strips having the compositions of 0.6C-18Mn-1.4Al, 0.6C-15Mn-1.4Al-0.5Si and 0.6C-15Mn-1.4Al-2.5Si were examined with respect to variation in hot-dip galvanizing properties, of which results are shown in FIG. 3.

As is clear from FIG. 1, the steel strip having a too low content of carbon has the rapid increasing zone of tensile strength due to the martensitic transformation, which causes work hardening of the structure so that cracks are created even with low external impact after machining.

Figure 2:
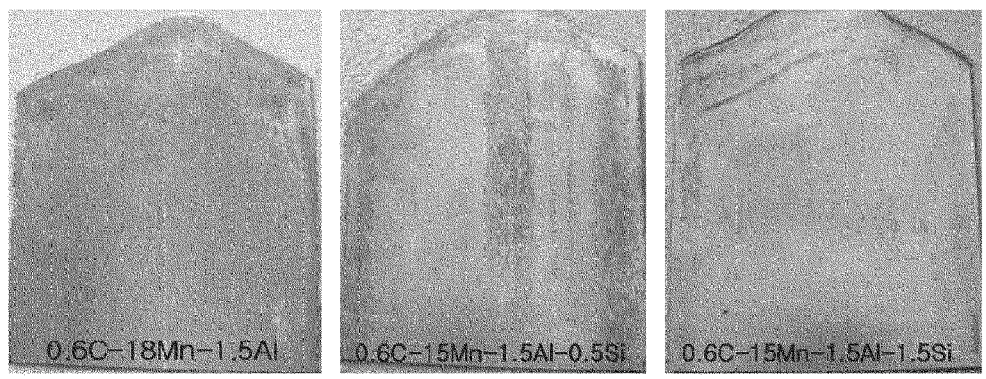
FIG. 2 comprises photographs showing results of observing effects of suppressing corrosion in air depending on added amounts of silicon and manganese.
Figure 2:
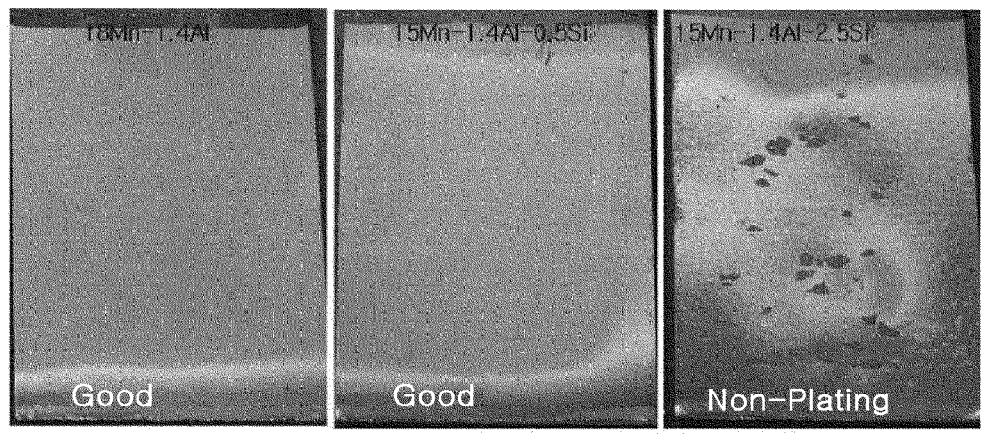

In addition, as is clear from FIG. 2, when the steel strip contains 0.5% Si, it reduces a corrosion rate of the steel strip in air so that surface corrosion of the steel strip is suppressed. Particularly, it can be seen from FIG. 2 that the steel strip containing 1.5% Si had surface corrosion further suppressed, whereas the steel strip without containing Si suffered from surface corrosion.

Therefore, it can be appreciated that the present invention enables manufacturing of hot-rolled and cold-rolled steel strips having superior surface properties.

Furthermore, as is clear from FIG. 3, when the steel strip contains a great amount of Si, there is a non-plating phenomenon on the steel strip.

As is apparent from the above description, the present invention can provide a steel strip that has superior formability, high strength, superior surface properties and plating characteristics, and a plated steel strip using the same.

Moreover, the present invention can provide a steel strip that not only has superior formability, high strength, superior surface properties and plating characteristics, but also is relieved in sensitivity to generation of cracks, and a plated steel strip using the same.

The invention claimed is:

1. A method for manufacturing a high Mn cold-rolled steel strip having superior surface properties and plating characteristics, comprising:
   homogenizing either a steel ingot or a continuous cast steel slab at 1,050-1,300° C., the steel ingot or the steel slab comprising, by weight%: 0.2-1.5% of C, 10 18 25% of Mn, 1.3-3.0% of Al, 0.45-2.0% of Si, 0.03% or less of P, 0.03% or less of S, 0.040% or less of N, 0.0005-0.010% of Ca, 0.001-0.020% of B, and the balance of Fe and other unavoidable impurities;
   hot rolling the homogenized steel ingot or steel slab with finish rolling at a finish rolling temperature of 850-950° C. to form a hot-rolled steel strip, followed by coiling the hot-rolled steel strip at a temperature of 700° C. or less;
   cold rolling the hot-rolled steel strip at a cold rolling reduction ratio of 30-80% to form a cold-rolled steel strip; and
   continuously annealing the cold-rolled steel strip at a temperature of 600° C. or more and
   over-aging the annealed steel strip at a temperature lower than the annealing temperature, forming a thin silicon oxide layer which suppresses oxidation of iron and manganese on the surface of the cold-rolled steel strip, wherein the steel strip contains fine aluminum nitrides and spheroidized non-metallic inclusions.

2. The method according to claim 1, wherein the steel ingot or slab further comprises 0.01-0.10% of Ti or 0.1-2.0% of Cr.

3. A method for manufacturing a high Mn plated steel strip, comprising:

homogenizing either a steel ingot or a continuous cast steel slab at 1,050-1,300° C., the steel ingot or the steel slab comprising, by weight%: 0.2-1.5% of C, 10-25% of Mn, 1.3-3.0% of Al, 0.45-2.0% of Si, 0.03% or less of P, 0.03% or less of S, 0.040% or less of N, 0.0005-0.010% of Ca, 0.001-0.020% of B, and the balance of Fe and other unavoidable impurities;

hot rolling the homogenized steel ingot or steel slab with finish rolling at a finish rolling temperature of 850-950° C. to form a hot-rolled steel strip, followed by coiling the hot-rolled steel strip at a temperature of 700° C. or less;

cold rolling the hot-rolled steel strip at a cold rolling reduction ratio of 30-80% to form a cold-rolled steel strip; and continuously annealing the cold-rolled steel strip at a temperature of 600° C. or more and over-aging the annealed steel strip at a temperature lower than the annealing temperature, forming a thin silicon oxide layer which suppresses oxidation of iron and manganese on the surface of the cold-rolled steel strip, followed by a plating treatment, wherein the steel strip contains fine aluminum nitrides and spheroidized non-metallic inclusions.

4. The method according to claim 3, wherein the plating treatment is one of electroplating, hot-dip galvanizing and galvannealing.

5. The method according to claim 4, wherein the steel ingot or slab further comprises 0.01-0.10% of Ti or 0.1-2.0% of Cr.

* * * * *

UNITED STATES PATENT AND TRADEMARK OFFICE
CERTIFICATE OF CORRECTION

PATENT NO. : 8,999,085 B2  
APPLICATION NO. : 12/158731  
DATED : April 7, 2015  
INVENTOR(S) : Seong Ju Kim et al.

Page 1 of 1

It is certified that error appears in the above-identified patent and that said Letters Patent is hereby corrected as shown below:

In the Claims

Column 10, Line 45, Claim 1, delete "10 18 25%" and insert -- 10 - 25% --

Signed and Sealed this  
Eleventh Day of August, 2015

Michelle K. Lee  
*Director of the United States Patent and Trademark Office*